US008881021B1

(12) United States Patent
Das et al.

(10) Patent No.: US 8,881,021 B1
(45) Date of Patent: Nov. 4, 2014

(54) AUTOMATED TOOLBAR PERSONALIZATION BASED ON USER METADATA

(75) Inventors: Kumar Das, San Francisco, CA (US); Melodie Chu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 12/968,992

(22) Filed: Dec. 15, 2010

(51) Int. Cl.
*G06F 3/048* (2013.01)
*G06F 15/16* (2006.01)

(52) U.S. Cl.
USPC .......................................... 715/744; 715/745

(58) Field of Classification Search
USPC .................................. 715/744, 745
See application file for complete search history.

(56) References Cited

U.S. PATENT DOCUMENTS

2007/0180020 A1* 8/2007 Woods .......................... 709/203
2009/0144723 A1* 6/2009 Hartin et al. .................. 717/173
2009/0287559 A1* 11/2009 Chen et al. ................. 705/14.23

OTHER PUBLICATIONS

"Conduit: Whatever you can imagine . . . imagine it on your own custom App"; http://www.conduit.com/Apps/Overview.aspx; print date: Dec. 15, 2010, 6 pages.
"VMN Toolbar—Enjoy a cool browsing experience"; http://toolbar.vmn.net/en/index.php; print date: Dec. 15, 2010, 2 pages.

* cited by examiner

*Primary Examiner* — Andrea Leggett
(74) *Attorney, Agent, or Firm* — Harrity & Harrity, LLP

(57) ABSTRACT

A toolbar, such as an add-on toolbar for a web browser, may be automatically created for a user based on the preferences or habits of the user. A device may, for example, receive metadata relating to habits or preferences of the user. The device may match the metadata to a set of toolbar objects to obtain one or more recommended toolbar objects for the user. The device may generate custom toolbar code that includes the one or more recommended toolbar objects and transmit the custom toolbar code to the user for installation of the custom toolbar code to implement a custom toolbar in the application program.

26 Claims, 9 Drawing Sheets

AUTOMATED TOOLBAR PERSONALIZATION BASED ON USER METADATA

BACKGROUND

Many techniques are available to users today to find information on the world wide web ("web"). For example, users often use web browsers and/or search engines to find information of interest.

Browsers, and other programs, may include the capability to include add-on toolbars to the browser interface. The toolbar may be presented as a graphical bar on which onscreen buttons, icons, menus or other input or output elements may be placed. Third-party developers may create add-on toolbars that add functionality to the browser. Users, at their discretion, may install toolbars in which they are interested.

One type of toolbar, called an "affinity" toolbar, is a toolbar that is branded by a particular advertiser, company, or other entity to include a theme or to provide information in which the user is interested. For example, a shoe retailer may release an affinity toolbar that includes the retailer's logo and includes a link to a news feed relating to new products/services or offers from the retailer.

Toolbar creation tools are known that allow users to create toolbars by graphically selecting objects that are to be included in the toolbar. The users may then offer the created toolbar to other users, such as through a web site.

SUMMARY

According to an implementation, a computing device implemented method may include receiving metadata relating to habits or preferences of a user and matching the metadata to a set of toolbar objects to obtain one or more recommended toolbar objects for the user. The method may further include generating custom toolbar code that includes the one or more recommended toolbar objects and transmitting the custom toolbar code to the user for installation of the custom toolbar code to implement a custom toolbar in an application program on a client device.

In another implementation, a device may include a storage component to store one or more toolbar objects designed to be included in a toolbar presented as part of the user interface of an application program executing on a client device; a toolbar object recommendation component to determine, based on metadata relating to a user, one or more toolbar objects, from the storage component, that are likely to be relevant to the user; a toolbar object verification component to interact with the user to determine which of the toolbar objects, determined by the toolbar object recommendation component, are desired by the user. The device may further include a toolbar generation component to: generate custom toolbar code that defines a customized toolbar that includes one or more of the toolbar objects that were determined by the toolbar object verification component as being desired by the user; and transmit the custom toolbar code to the user for installation.

In yet another implementation, a computer-readable medium may include one or more instructions to receive metadata relating to habits or preferences of a user; one or more instructions to match the metadata to a set of toolbar objects to obtain one or more recommended toolbar objects for the user; one or more instructions to generate custom toolbar code that includes the one or more recommended toolbar objects; and one or more instructions to transmit the custom toolbar code, to the user, for installation of the custom toolbar code to implement a custom toolbar in an application program.

In yet another implementation, a computing device implemented method may include receiving metadata relating to a user and matching the metadata to a set of toolbar objects to obtain one or more recommended toolbar objects for the user, where each of the toolbar objects, in the set, includes an object designed to be included in a toolbar of a web browser. The method may further include verifying, through interaction with the user, which of the one or more recommended toolbar objects are desired by the user; generating custom toolbar code that includes the one or more recommended toolbar objects that are desired by the user; and transmitting the custom toolbar code, to the user, for installation of the custom toolbar code to implement a custom toolbar in the web browser.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

A toolbar, such as an add-on toolbar for a web browser, may be automatically created for a user. The toolbar may include elements, called toolbar objects herein, that may be selected based on user-specific information, such as metadata relating the user's browsing history, search history, shopping history, or other metadata.

Figure 1:
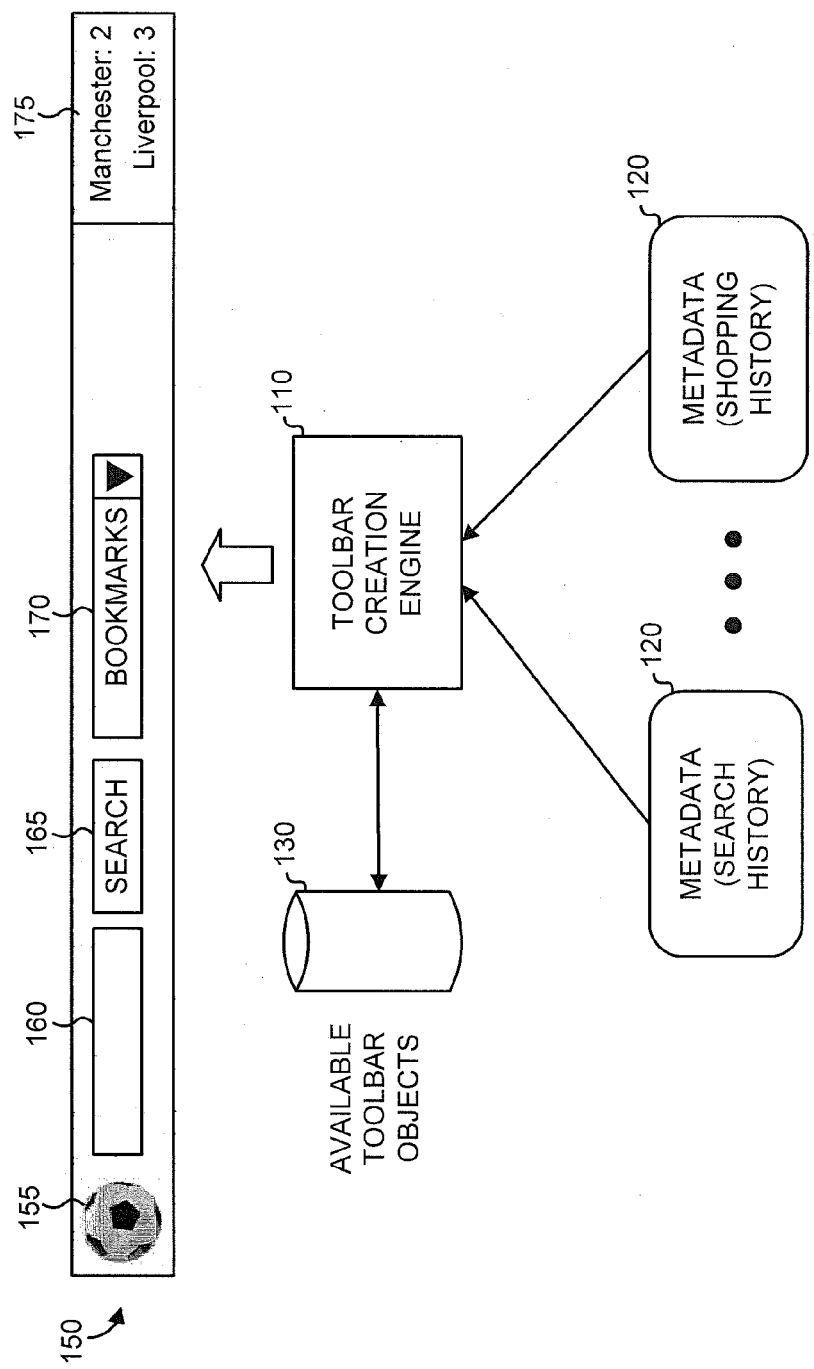
FIG. 1 is a diagram illustrating an overview of an example implementation described herein.

FIG. 1 is a diagram illustrating an overview of an example implementation described herein. Assume that a user, through their browsing history or other online interactions, has expressed an interest in soccer. For example, the user may have performed web searches using queries relating to soccer, soccer teams, and/or recent soccer tournaments. The user may also have visited web sites relating to soccer teams and soccer players.

Assume that the user's web searches and browsing history are available as user metadata to toolbar creation engine 110, which may be a remote web service, from user metadata sources 120. Toolbar creation engine 110 may analyze the user metadata to determine toolbar objects in which the user is likely to be interested. Toolbar creation component 110 may, for example, compare the user metadata to a set of available toolbar objects 130. Possibly after receiving additional user input, toolbar creation component 110 may generate a customized toolbar 150 for the user.

Assume that, based on the user's metadata, toolbar creation engine 110 determines that the user is interested in professional soccer and may generate customized toolbar 150 to include soccer-related toolbar objects. Customized toolbar 150 is particularly shown as including toolbar objects 155, 160, 165, 170, and 175. Toolbar object 155 includes a soccer-related image. Toolbar objects 160 and 165 may be, respectively, a search box in which a user may type a search query and a button to submit the search query. Toolbar object 170 may include a bookmark control in which a number of default bookmarks, linking to soccer websites, such as the home pages of professional soccer teams, are stored. Toolbar object 175 may be a score update object in which scores of recent soccer matches are displayed.

Example Environment

Figure 2:
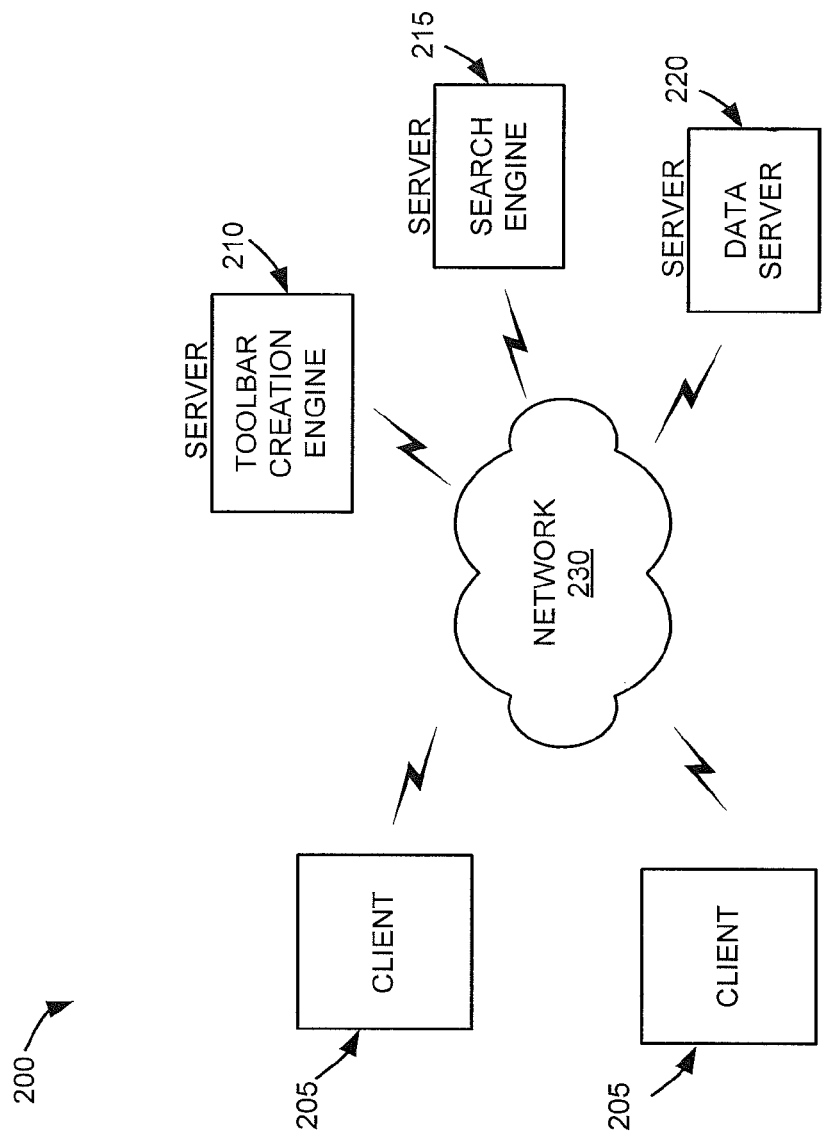
FIG. 2 is a diagram of an example of an environment in which systems and/or methods described herein may be implemented.

FIG. 2 is a diagram of an example environment 200 in which systems and/or methods described herein may be implemented. Environment 200 may include multiple clients 205 connected to multiple servers 210-220 via a network 230. Two clients 205 and three servers 210, 215, and 220 have been illustrated as connected to network 230 for simplicity. In practice, there may be more or fewer clients and servers. Also, in some instances, a client may perform a function of a server, and a server may perform a function of a client.

Client 205 may include a device, such as a personal computer, a wireless telephone, a personal digital assistant (PDA), a lap top, or another type of computation or communication device; a thread or process running on one of these devices; and/or an object executed by one of these devices. In one implementation, client 205 may include a user interface, presented through a browser, that permits documents to be searched and/or accessed. The user interface of client 205 may particularly include a browser capable of hosting customized toolbars. Client 205 may obtain the customized toolbars from server 210 or from another source.

Servers 210, 215, and 220 may include server devices that gather, process, search, and/or implement services in a manner described herein. In one implementation, server 210 may host a toolbar creation engine that generates and provides customized toolbars to clients 205. Server 215 may implement a search engine that may respond to a search query from a client 205 with one or more links to documents that are relevant to the search query. In some situations, such as when the user is logged into an account, the search engine may store information relating to search queries submitted by a user, document browsing history of the user, or other information describing the habits or preferences of the user. The information describing the search habits of the user may be stored as metadata relating to the user. The metadata may be stored at server 215 or at another server, such as data server 220.

Additional servers, implementing services other than the toolbar creation engine or the search engine, although not explicitly shown, may also be implemented in environment 200. The additional servers may implement, for example, payment services, shopping services, social networking services, etc. Metadata relating to user interaction with these services may also be stored, such as being stored at data server 220.

Data server 220 may store or maintain data, such as metadata relating to users of clients 205. The metadata may explicitly or implicitly describe the habits or preferences of the users of clients 205.

While servers 210 through 220 are shown as separate components, it may be possible for one or more of servers 210-220 to perform one or more of the functions of another one or more of servers 210-220. For example, it may be possible that two or more of servers 210-220 are implemented as a single server. It may also be possible for a single one of servers 210-220 to be implemented as two or more separate (and possibly distributed) servers.

Network 230 may include any type of network, such as a local area network (LAN), a wide area network (WAN), a telephone network (e.g., the Public Switched Telephone Network (PSTN) or a cellular network), an intranet, the Internet, or a combination of networks. Clients 205 and servers 210-220 may connect to network 230 via wired and/or wireless connections.

Example Components of Client and/or Server

Figure 3:
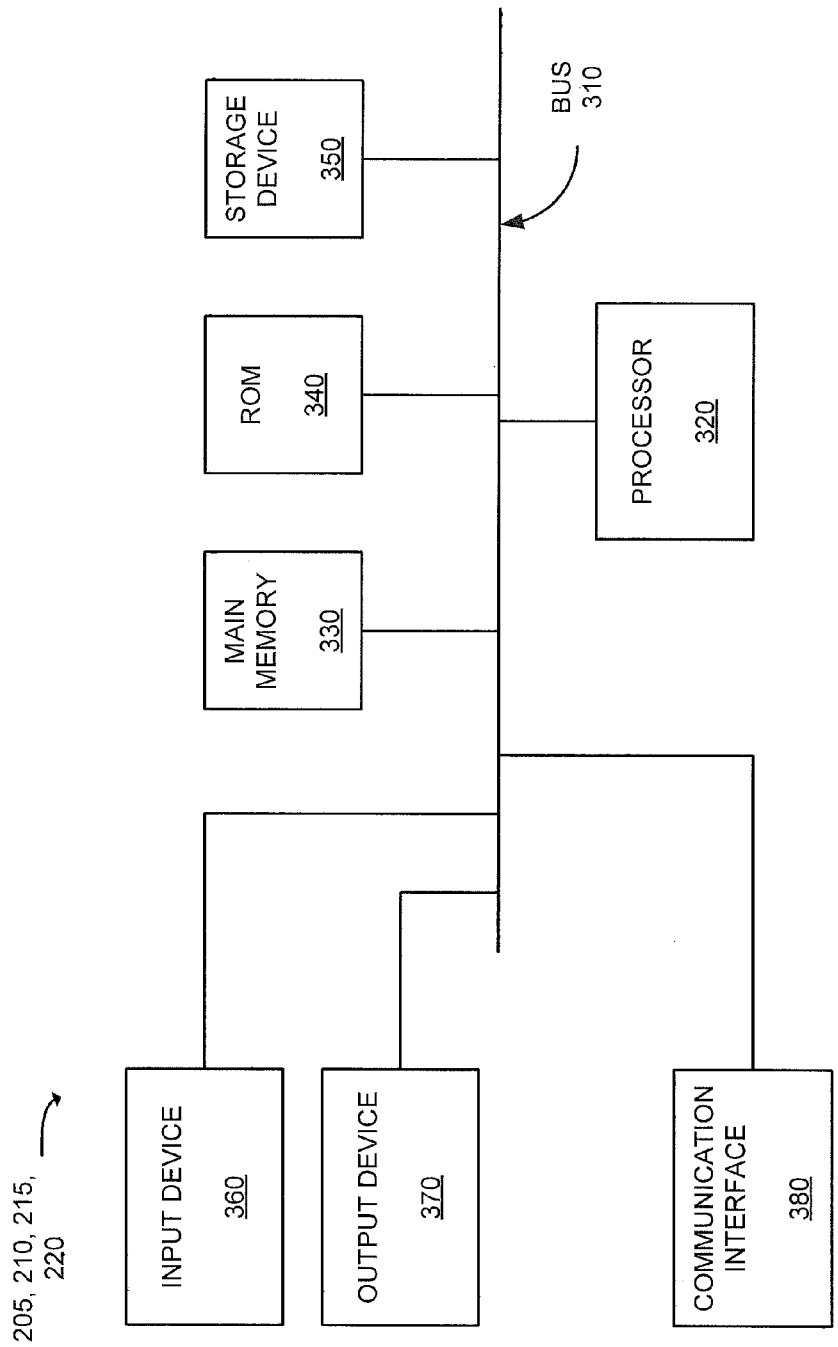
FIG. 3 is a diagram of an example of components of a client or a server of FIG. 2.

FIG. 3 is a diagram of example components of a client or server (hereinafter called "client/server"), which may correspond to one or more of clients 205 and/or servers 210-220. As shown in FIG. 3, the client/server may include a bus 310, a processor 320, a main memory 330, a read only memory (ROM) 340, a storage device 350, an input device 360, an output device 370, and a communication interface 380. In another implementation, the client/server may include additional, fewer, different, or differently arranged components than are illustrated in FIG. 3.

Bus 310 may include a path that permits communication among the components of the client/server. Processor 320 may include a processor, a microprocessor, or processing logic (e.g., an application specific integrated circuit (ASIC) or a field programmable gate array (FPGA)) that interprets and executes instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server, such as a keyboard, a mouse, a button, a pen, a touch screen, voice recognition and/or biometric mechanisms, etc. Output device 370 may include a mechanism that outputs information to the operator, such as a display, a light emitting diode (LED), a speaker, etc. Communication interface 380 may include any transceiver-like mechanism that enables the client/server to communicate with other devices and/or systems. For example, communication interface 380 may include mechanisms for communicating with another device or system via a network, such as network 230.

As will be described in detail below, the client/server may perform certain operations relating to the generation of customized toolbars. The client/server may perform these operations in response to processor 320 executing software instructions contained in a computer-readable medium, such as memory 330. A computer-readable medium may be defined as a logical or physical memory device. A logical memory device may include space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Example Server Functional Components

Figure 4:
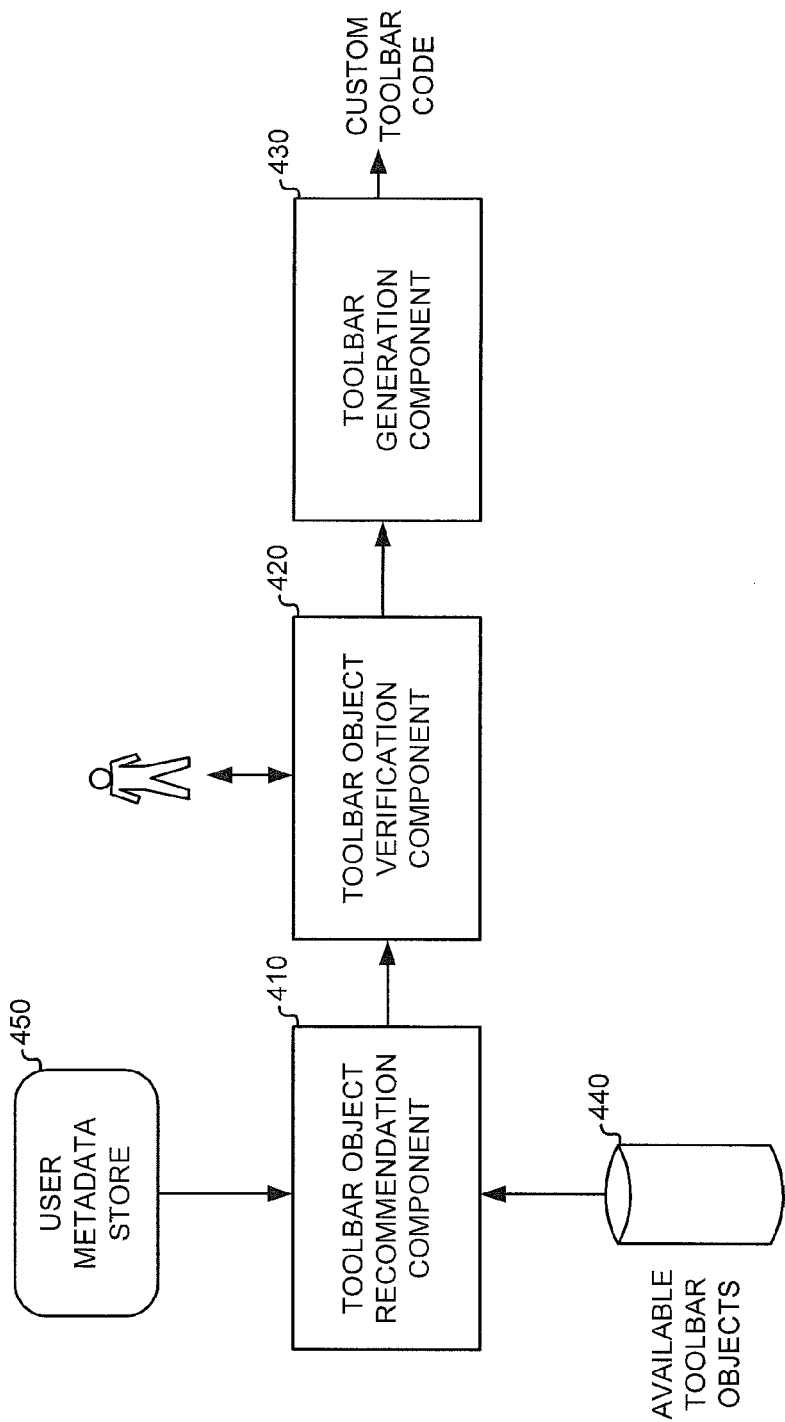
FIG. 4 is a diagram of an example of functional components of a server, such as a server that hosts a toolbar creation engine.

FIG. 4 is a diagram of an example of functional components of a server, such as server 210, that hosts the toolbar creation engine. As shown in FIG. 4, server 210 may include a toolbar object recommendation component 410, a toolbar object verification component 420, a toolbar generation component 430, available toolbar objects 440, and user metadata store 450. In another implementation, server 210 may include more or fewer functional components. For example, one or more of the functional components shown in FIG. 4 may be located in a device separate from server 210.

Available toolbar objects 440 may represent a database or other storage structure in which toolbar objects, which may be placed in the final customized toolbar, are stored. As the phrase is used herein, a "toolbar object" may include any object that can be included in a toolbar. Each toolbar object may be implemented using, for example, images, programming script, other programming instructions, a markup language, text files, etc. In general, the specific implementation of the toolbar objects may be dependent on the browser on which the customized toolbar is designed to operate. Each toolbar object may be presented on the toolbar as, for example, an image (such as for toolbar object 155, a soccer ball image), a link, a button that performs a function when selected (such as toolbar object 165, the search button), a graphical object (e.g., banner, logo) that provides information to the user (such as toolbar object 175, a soccer match score update graphic), a textbox to enter information (such as toolbar object 160, a search query entry box), a video or audio control object, or another type of object. Available toolbar objects 440 may be pre-populated by the administrator (or another entity) of the toolbar creation engine. In some implementations, a pre-populated toolbar object may itself include configurable properties that may be customized based on user metadata. For example, a bookmark toolbar object that provides an easily accessible list of frequently visited web links may be populated with links derived from the browsing history of the user.

User metadata store 450 may include one or more sources from which metadata relating to the user is retrieved. Metadata store 450 may be implemented as a database or other structure in which user metadata may be stored. In one implementation, toolbar object recommendation component 410 may connect directly to servers/services that maintain metadata (e.g., such as search engine 215, a shopping service, a social site, etc.). In such a situation, metadata "store" 450 may be physically implemented at a number of remote servers/services. As previously mentioned, user metadata, such as that provided by metadata store 450, may include any data that explicitly or implicitly describes the habits or preferences of the users. Additional examples of such data may include user bookmarks, documents selected from search results provided to the user, browsing history, web documents at which a user spends at least a threshold amount of time, information from a web form filled-out by the user. As another example of metadata, the metadata may include data generated from the user's interaction with or use of client applications. For example, the use of a word processing application or documents generated by the user when using the word processing application may be used to determine the habits or preferences of the user.

Toolbar object recommendation component 410 may determine toolbar objects in which the user is likely to be interested. Toolbar object recommendation component 410 may analyze the user metadata to determine topics of interest to the user. Based on the analysis, toolbar object recommendation component 410 may determine a set of toolbar objects that are likely to be of interest to the user. In some implementations, toolbar object recommendation component 410 may take other factors into account when determining the set of toolbar objects, such as a minimum or maximum number of potential recommended toolbar objects, whether certain toolbar objects are mandatory toolbar objects that should always be recommended to the user, etc. The operation of toolbar object recommendation component 410 will be described in more detail below.

Toolbar object verification component 420 may interact with the user to determine the final toolbar objects that are to be included in the customized toolbar. In one implementation, a description of the set of toolbar objects selected by toolbar object recommendation component 410 may be provided to the user via a web browser. The user may select the toolbar objects that the user desires in the customized toolbar.

In one alternative implementation, toolbar object verification component 420 may not be implemented. Instead, the toolbar objects recommended by toolbar object recommendation component 410 may be passed directly to toolbar generation component 430.

Toolbar generation component 430 may generate the code corresponding to the user's custom toolbar. The operation of toolbar generation component 430 in generating the toolbar code may be specific to the browser, or other program, in which the toolbar is to be installed. For example, for the Mozilla Firefox browser, browser user interface extensions may be code written in XUL (XML user interface language) and JavaScript. Accordingly, the toolbar objects (also called widgets) may include functionality implemented in JavaScript and user interface elements written in XUL. Toolbar generation component 430 may include a template XUL document that defines an interface for a basic toolbar that does not include toolbar objects. Toolbar generation component 430 may insert references for the desired toolbar objects into the template XUL toolbar.

Although FIG. 4 shows particular functional components of server 210, in other implementations, server 210 may include fewer, different, differently arranged, or additional functional components than depicted in FIG. 4. In still other implementations, one or more components of server 210 may perform one or more tasks performed by one or more other functional components of server 210.

Creation of Customized Toolbars

Figure 5:
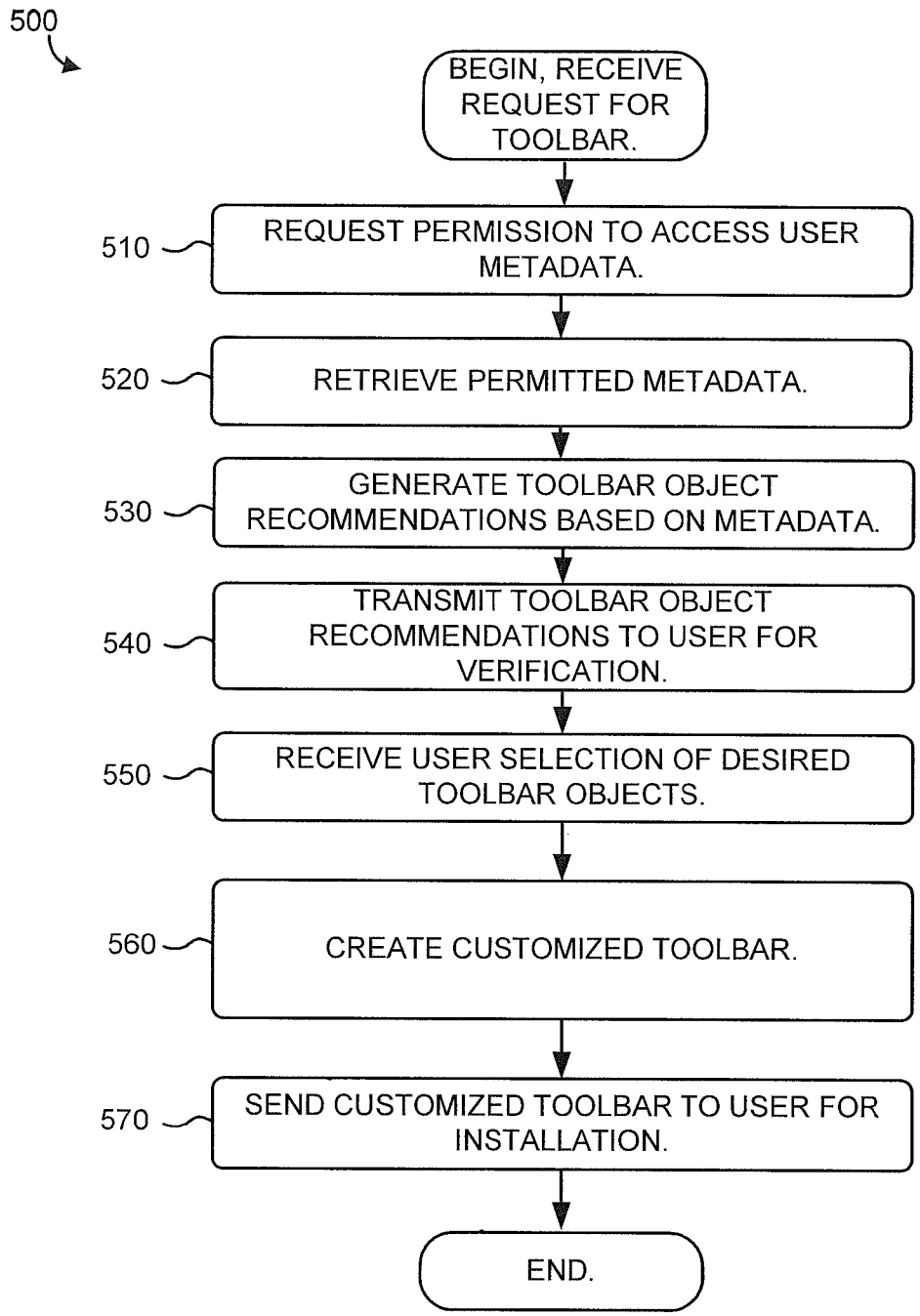
FIG. 5 is a flowchart of an example process for creating a customized toolbar.

FIG. 5 is a flowchart of an exemplary process 500 for creating a customized toolbar. In one implementation, process 500 may be performed by one or more components within server 210, or within a combination of server 210 and other servers, such as server 215 and server 220. In another implementation, process 500 may be performed by one or more components within another device or a group of devices separate from or including server 210.

Process 500 may include, in response to a request from a user for a customized toolbar, requesting permission to access user metadata (block 510). The request to access the user metadata may be made, for example, through a web interface presented to the user. Assume that the user maintains accounts with a number of sites and/or services that supply information to metadata store 450. For example, metadata relating to the user's browsing history and/or search history may be stored, such as by search engine 215 or by a browser extension installed as part of the user's browser. The user's browsing history and/or search history, or information derived from the user's browsing history and/or search history, may be provided to metadata store 450. Metadata relating to other accounts and/or services, such as shopping-related metadata that defines products in which the user has shown an interest, metadata related to a user's blog reader account that defines topics to which the user subscribes, or other metadata, may also be provided to metadata store 450.

Figure 6:
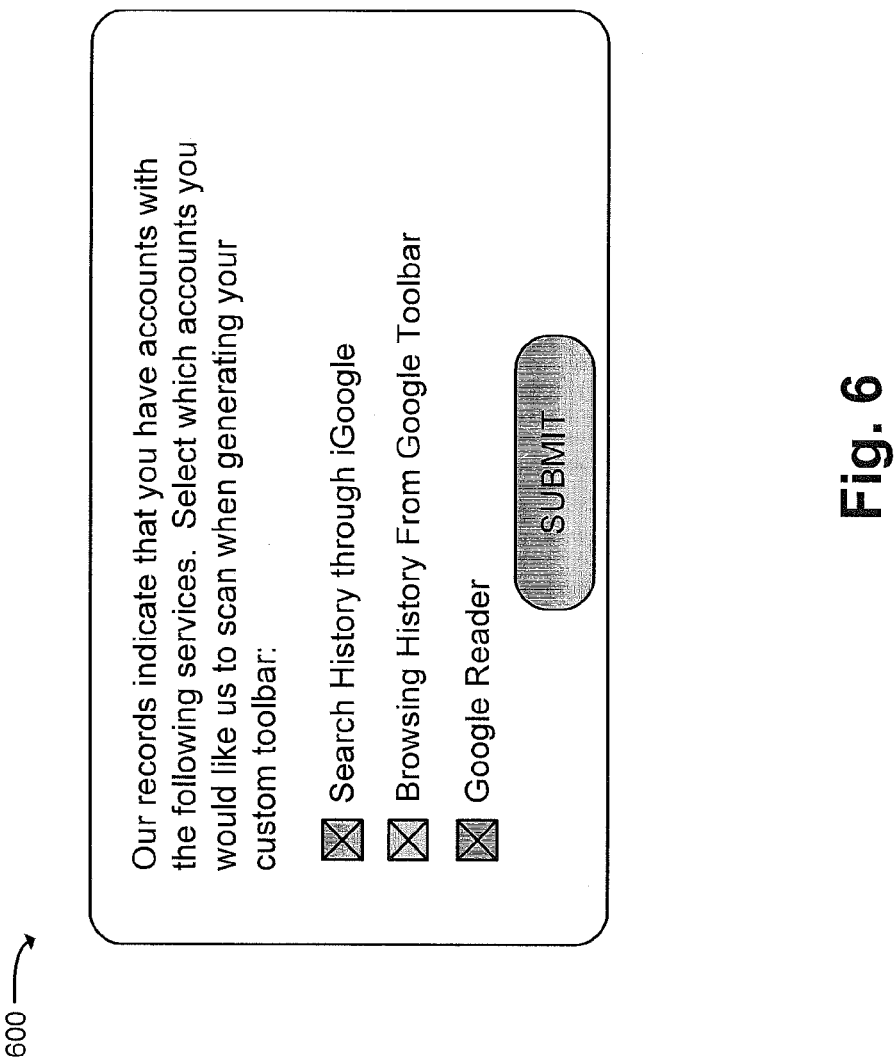
FIG. 6 is a diagram illustrating an example of a user interface that may be presented to a user to request permission to access the user's metadata.

FIG. 6 is a diagram illustrating an example of a user interface 600 that may be presented to the user to request permission to access the user's metadata. In one implementation, user interface 600 may be presented to the user via a web browser presented in a client 205.

Interface 600 may provide the user with a list of accounts, from which metadata relating to the user, is available. Interface 600 may give the user an opportunity to give permission to or deny permission to toolbar object recommendation component 410 to access the metadata associated with these accounts. In the example shown, three accounts are shown for user approval: an account through which toolbar object recommendation component 410 may obtain metadata relating to user search history (e.g., search queries and search result selections), an account through which toolbar object recommendation component 410 may obtain metadata relating to the user's web browsing history, and an account through which toolbar object recommendation component 410 may obtain metadata relating to blogs read by the user.

Process 500 may further include retrieving the metadata, as permitted by the user in block 510 (block 520). The metadata may be retrieved, for example, from metadata store 450.

Based on the retrieved metadata, toolbar object recommendations may be generated (block 530). The toolbar object recommendations may include toolbar objects, from the set of toolbar objects corresponding to available toolbar objects 440, that toolbar object recommendation component 410 determines to correspond to or match interests of the user. Toolbar object recommendation component 410 may make this determination based on an analysis of the retrieved metadata and on available toolbar objects 440. Toolbar object recommendation component 410 may, for example, analyze the received metadata to determine topics or keywords relating to habits/preferences of the user. Toolbar object recommendation component 410 may then match the topics/keywords to topics/keywords to which available toolbar objects 440 are relevant, to obtain the toolbar object recommendations. The recommended toolbar objects may be provided to toolbar object verification component 420.

In one implementation, each toolbar object, in available toolbar objects 440, may be assigned one or more topic labels. Toolbar object recommendation component 410 may match the topic labels to topics/keywords from metadata store 450 to obtain matching toolbar objects, which may then be output from toolbar object recommendation component 410 as recommended toolbar objects.

Process 500 may further include verifying, by the user, the recommend toolbar objects (block 540). Toolbar object verification component 420 may, for example, transmit the recommended toolbar objects to the user and present the toolbar objects as a list of objects that the user may desire to incorporate into the customized toolbar. The user may choose which of these toolbar objects the user would like in the customized toolbar.

Figure 7:
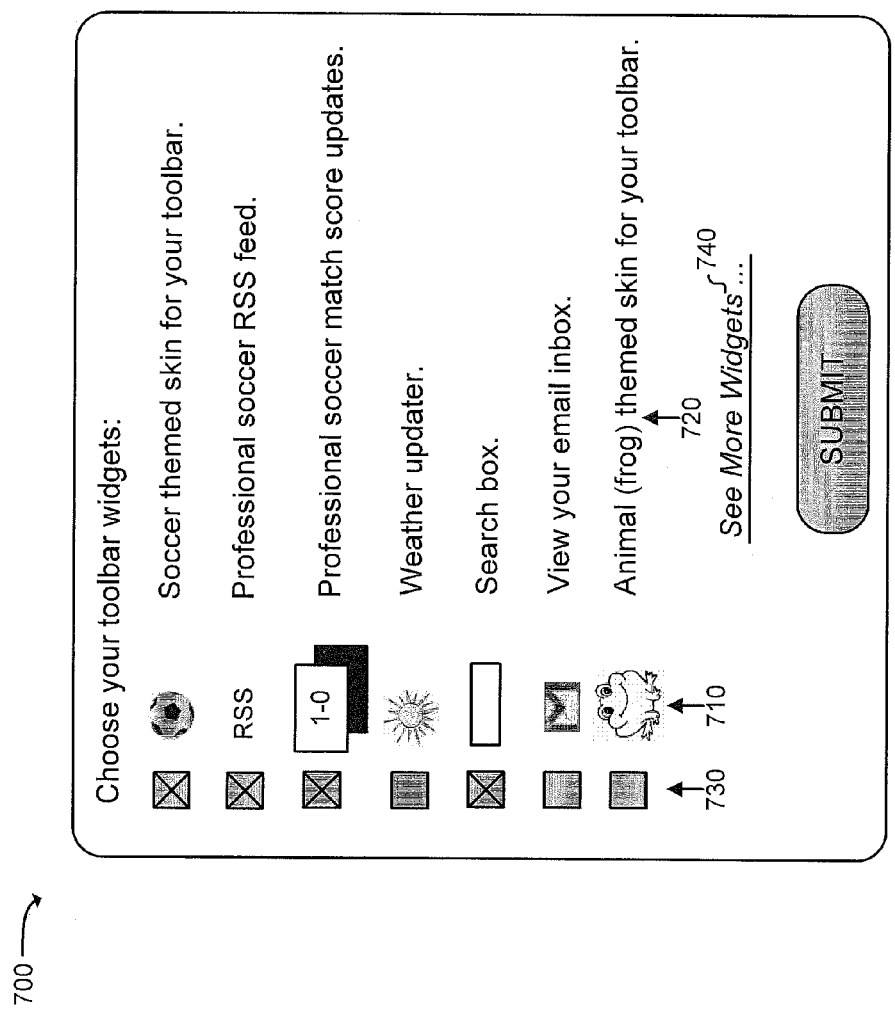
FIG. 7 is a diagram illustrating an example of a user interface that may be presented to the user to get user verification of toolbar objects to incorporate into a custom toolbar.

FIG. 7 is a diagram illustrating an example of a user interface 700 that may be presented to the user to get user verification of toolbar objects to incorporate into a custom toolbar. In one implementation, user interface 700 may be presented to the user via a web browser presented in a client 205.

Interface 700 may provide the user with a list of toolbar objects (widgets) that have been recommended for the user. Through interface 700, the user may select particular ones of the available presented toolbar objects. In interface 700, each toolbar object is presented as a graphic representation 710 and a corresponding description 720. The user may indicate selection of a toolbar object by selecting corresponding checkboxes 730. As is also shown in interface 700, a "see more" link 740 may be provided to allow the user to request additional toolbar object recommendations from the toolbar creation engine.

At some point, the user may submit the selected toolbar objects to toolbar verification component 420 (such as by selecting the "submit" button in interface 700). In response, process 600 may further include receiving the user selection of the desired toolbar objects (block 550).

Process 500 may further include creating, based on the user selection of the desired toolbar objects, a custom toolbar (block 560). As previously mentioned, toolbar generation component 430 may generate the programming instructions (code) corresponding to the user's custom toolbar. The toolbar code may be specific to the browser, or other program, into which the toolbar is to be installed. Toolbar generation component 430 may operate based on a template document or program that defines an interface for a basic "template" toolbar that does not include toolbar objects. Toolbar generation component 430 may insert references for the desired toolbar objects into the template.

Toolbar generation component 430 may insert some toolbar objects into the customized toolbar even if they were not chosen by the user. For instance, certain toolbar objects, such as advertisement objects or objects considered to be "core" to the functionality of the toolbar, may be placed into every toolbar.

Process 500 may further include transmitting the customized toolbar to the user for installation (block 570). In other words, the user may download and install the customized toolbar. Because the toolbar includes elements that were selected for the specific user, the user may be likely to consider the toolbar useful and to therefore keep the toolbar installed.

In an alternative possible implementation, instead of toolbar generation component 430 modifying a single template toolbar, a number of template toolbars, possibly with different base functionality and/or appearance may be maintained by toolbar generation component 430. The user may then separately choose, or toolbar object recommendation component 410 may select, the template toolbar that will be used by toolbar generation component 430.

Although process 500 was described as creating a customized toolbar, in alternative possible implementations, application extensions other than a toolbar may be similarly customized. Similarly, although the examples given above were for customization of a browser, in alternative possible implementations, application programs other than a browser, such as an email application, word processing application, or other application may be customized to include a custom toolbar.

Figure 8:
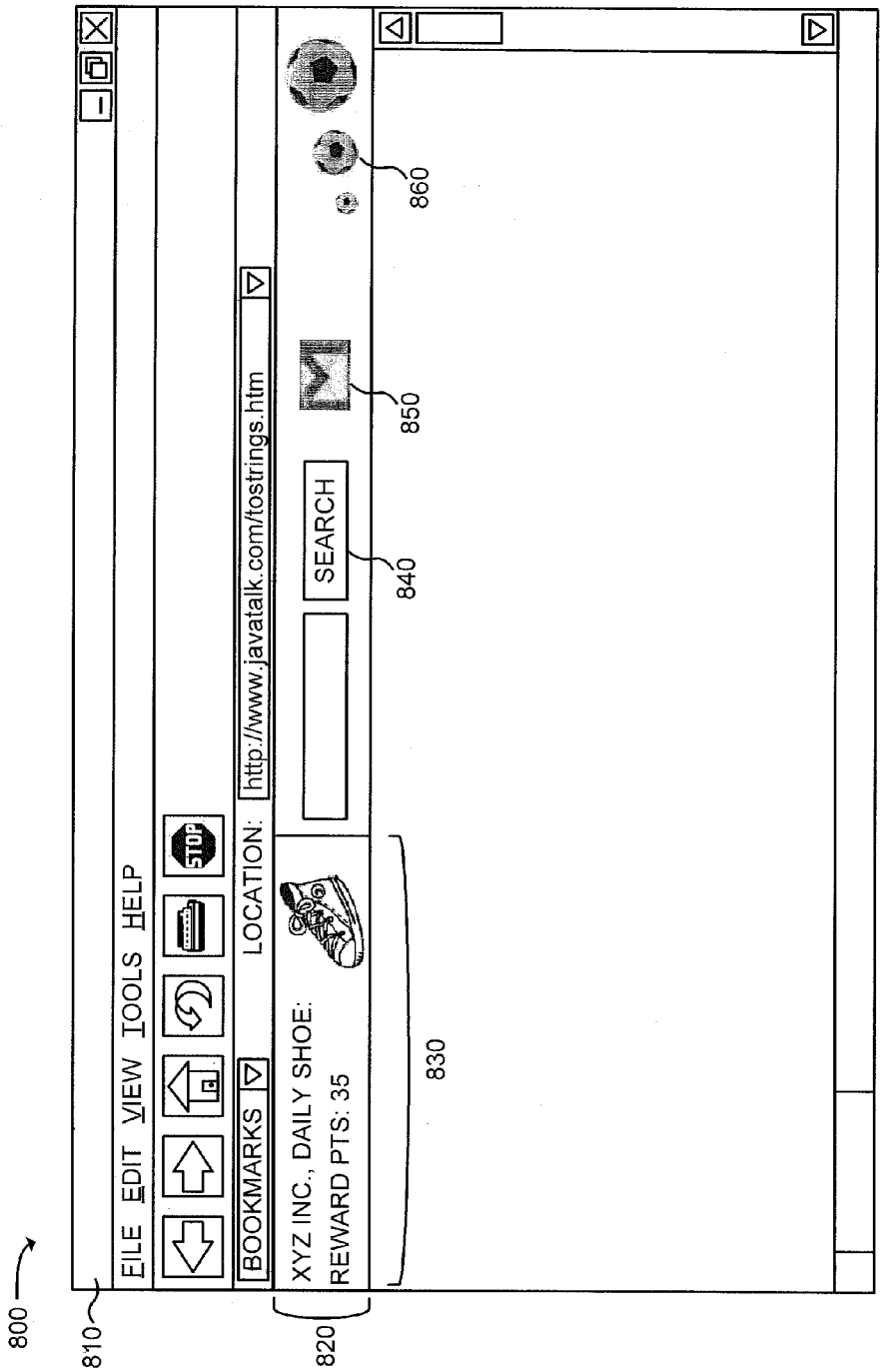
FIG. 8 is a diagram illustrating an example of a graphical interface that includes a custom toolbar.

FIG. 8 is a diagram illustrating an example of a graphical interface 800 that includes a custom toolbar, such as a custom toolbar created as described with respect to process 500. As shown, graphical interface 800 includes a web browser interface 810, which may include custom toolbar 820.

Custom toolbar 820 may include a number of toolbar objects. Assume that at least some of the toolbar objects were included in custom toolbar 820 in response to selection by the user of recommended toolbar objects generated by toolbar object recommendation component 410. As shown in FIG. 8, custom toolbar 820 particularly includes: advertisement object 830, search engine object 840, email object 850, and graphic theme object 860.

Assume that toolbar 820 was generated in response to a user whose search history and shopping history indicates that the user purchases shoes and is interested in soccer. Advertisement object 830 may be a toolbar object sponsored by a company that manufactures shoes (XYZ Inc.). Advertisement object 830 may display a daily rotating advertisement (e.g., an image) for a featured show from XYZ Inc. By continuing to keep advertisement object 830 on toolbar 820, the user may receive "award points" that may be used, for example, for rebates on shoes purchased from XYZ Inc. Award points may be awarded for other user activities, such as navigating to specific web sites or clicking-through the shoe image (i.e., opening a link associated with the shoe image). Because the user's metadata indicated that the user may be interested in shoe-related advertisements, and potentially also because the user chose to display advertisement 830, advertisement 830 may be more effective than other forms of advertising.

In FIG. 8, assume that advertisement object 830 and toolbar graphic theme object 860 were explicitly chosen by the user based on recommended toolbar objects provided from toolbar object recommendation component 410. Further, assume that search engine object 840 and email object 850 are toolbar objects that are placed in toolbar 820 without first verifying the user's desire to include these objects in toolbar 820. In this manner, the toolbar creation engine may generate toolbars that include a mix of user selected toolbar objects and not-user-selected objects, potentially giving the entity hosting the toolbar creation engine a high level flexibility in constructing the custom toolbars. In some implementations, an entity such as a search engine provider, may include a mandatory search box in each toolbar and may reward web sites or other entities to encourage them to enlist users to download custom toolbars that include the mandatory search box.

Figure 9:
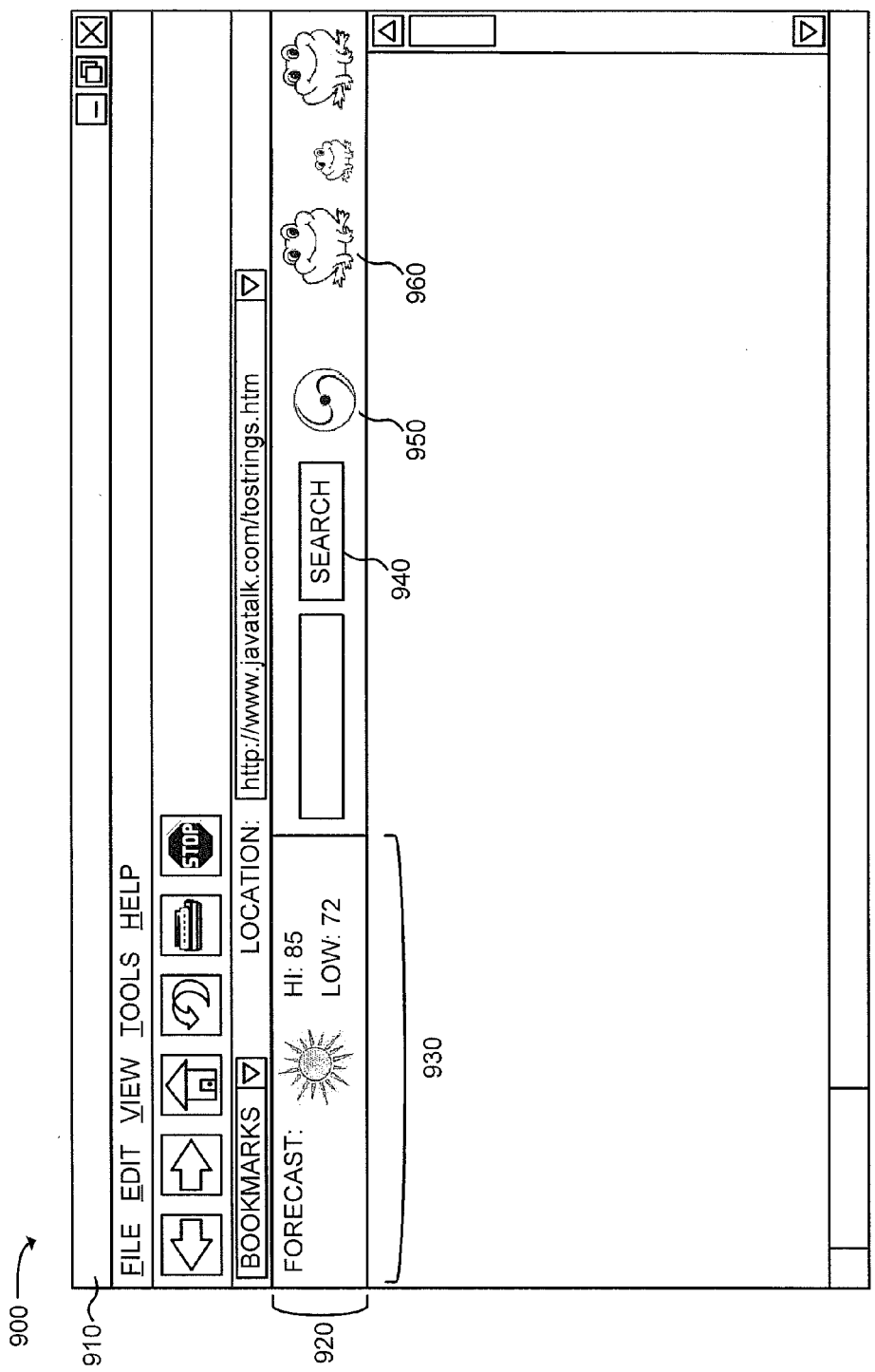
FIG. 9 is a diagram illustrating an example of another graphical interface that includes a custom toolbar.

FIG. 9 is a diagram illustrating an example of another graphical interface 900 that includes a custom toolbar, such as a custom toolbar created as described with respect to process 500. As shown, graphical interface 900 includes a web browser interface 910, which may include custom toolbar 920.

Custom toolbar 920 may be similar to custom toolbar 820 in that custom toolbar 920 includes a number of user-selected toolbar objects and some toolbar objects that were not explicitly selected by the user. As shown in FIG. 9, custom toolbar 920 may particularly include: weather object 930, search engine object 940, toolbar rotate object 950, and a toolbar graphic theme object 960.

In FIG. 9, assume that weather object 930, toolbar rotate object 950, and toolbar graphic theme object 960 were explicitly chosen by the user based on recommended toolbar objects provided from toolbar object recommendation component 410. Further, assume that search engine object 940 is placed in toolbar 920 without first verifying the user's desire to include the object in toolbar 920. Toolbar rotate object 950 may be a toolbar object that allows users to "rotate" through sets of toolbar objects. For example, upon selection of rotate object 950, toolbar 920 may be changed to display a new set of toolbar objects. In this manner, a user may be able to easily change between sets of custom selected toolbar objects.

In alternative implementations, instead of including a rotate object in a customized toolbar, the toolbar may be configured to automatically rotate to a set of presented toolbar objects, such as an automatic rotation triggered by an event (e.g., each time the browser is initiated) or time interval (e.g., change the active toolbar objects every day or week). Alternatively, toolbar objects from different toolbars could be exchanged.

CONCLUSION

An implementation, described herein, may enable users to obtain customized toolbars that are used, for example, in a browser or other software application. The customized toolbars may be automatically generated based on user metadata. Allowing users to brand or control the objects in a toolbar may increase toolbar affinity, toolbar use, and toolbar retention rates.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

Also, exemplary graphical user interfaces have been described with respect to FIGS. 6-9. In other implementations, the graphical user interfaces may include more, fewer, or different pieces of information.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor-creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by one or more processors and to a client device associated with a user, information identifying a plurality of accounts, associated with a plurality of sources from which metadata is available;
      each source, of the plurality of sources, corresponding to a service that includes a corresponding account, of the plurality of accounts, associated with the user, and
      metadata, received from each source, relating to activities associated with a use of the corresponding service by the user;
   receiving, by the one or more processors and based on providing the information identifying the plurality of accounts, permission, from the user, to obtain the metadata from the plurality of sources;
   obtaining, by the one or more processors and based on receiving the permission from the user, the metadata from the plurality of sources;
   matching, by the one or more processors, the metadata to a set of toolbar objects to obtain a group of recommended toolbar objects for the user,
      each of the toolbar objects, in the set of toolbar objects, including an object designed to be included in a toolbar of an application program on the client device;
   providing, by the one or more processors, information identifying the group of recommended toolbar objects for display to the user via the client device;
   receiving, by the one or more processors, a selection of one or more recommended toolbar objects, of the group of recommended toolbar objects;
   generating, by the one or more processors and based on the selection, custom toolbar code that includes code corresponding to the one or more recommended toolbar objects; and
   transmitting, by the one or more processors, the custom toolbar code, to the user, for installation of the custom toolbar code to implement a custom toolbar in the application program of the client device.

2. The method of claim 1, where generating the custom toolbar code includes:
   inserting the code corresponding to the one or more recommended toolbar objects into code of a toolbar template.

3. The method of claim 1, where matching the metadata to the set of toolbar objects includes:
   determining topics associated with the metadata;
   associating the toolbar objects, in the set of toolbar objects, with topics to which the toolbar objects relate; and
   matching the topics associated with the metadata to the topics to which the toolbar objects relate to obtain the group of recommended toolbar objects.

4. The method of claim 1, where the application program is a web browser application and the toolbar is presented within a user interface of the web browser application.

5. The method of claim 1, where the metadata includes data derived from a combination of:
   a browsing history of the user,
   a searching history of the user,
   user bookmarks,
   a shopping history of the user, or
   user generated documents.

6. The method of claim 1, further comprising:
   providing information identifying a plurality of toolbar templates for display to the user; and
   receiving a selection of a particular toolbar template of the plurality of toolbar templates; and
   where generating the custom toolbar code includes:
      generating the custom toolbar code based on the particular toolbar template.

7. The method of claim 1, where the custom toolbar code, in addition to including the code corresponding to the one or more recommended toolbar objects, includes code corresponding to one or more other toolbar objects.

8. The method of claim 1, where the generated custom toolbar code includes toolbar objects to present advertisements to the user.

9. The method of claim 1, where the generated custom toolbar code includes a toolbar object that, when selected by the user, changes the toolbar objects presented by the custom toolbar.

10. The method of claim 1, where matching the metadata includes:
    analyzing the metadata to determine topics or keywords relating to habits or preferences of the user.

11. A device comprising:
    a storage component, implemented at least partially in hardware, to:
       store a plurality of toolbar objects,
          the plurality of toolbar objects being designed to be included in a toolbar presented as part of a user interface of an application program executing on a client device;
    a toolbar object recommendation component, implemented at least partially in hardware, to:
       receive, from a user of the user interface, permission to access a plurality of sources from which metadata, relating to the user, is available,
          each source, of the plurality of sources, corresponding to a service that includes a corresponding account associated with the user, and
          metadata, received from each source, relating to activities associated with a use of the corresponding service by the user,
       access, based on receiving the permission, the plurality of sources to obtain the metadata relating to the user,
       determine, based on the metadata relating to the user, a group of toolbar objects, of the plurality of toolbar objects stored in the storage component, that are likely to be relevant to the user;
    a toolbar object verification component, implemented at least partially in hardware, to:
       interact with the user to identify one or more toolbar objects, of the group of toolbar objects determined by the toolbar object recommendation component, that are desired by the user; and
    a toolbar generation component, implemented at least partially in hardware, to:
       generate custom toolbar code that defines a customized toolbar that includes the one or more of the toolbar objects, of the group of toolbar objects, that were determined by the toolbar object verification component as being desired by the user, and
       transmit the custom toolbar code to the client device for installation.

12. The device of claim 11, where the toolbar generation component is further to:
- determine, based on the metadata relating to the user, a toolbar template for generating the custom toolbar code; and
- where, when generating the custom toolbar code, the toolbar generation component is to:
  - generate the custom toolbar code based on the toolbar template.

13. The device of claim 11, where the toolbar generation component is further to:
- insert code, corresponding to the one or more toolbar objects that were determined by the toolbar object verification component as being desired by the user, into template toolbar code.

14. The device of claim 11, where, when determining the group of toolbar objects, the toolbar object recommendation component is to:
- associate the plurality of toolbar objects with topics to which the plurality of toolbar objects relate; and
- match the metadata to the topics to determine the group of toolbar objects that are likely to be relevant to the user.

15. The device of claim 11, where the application program is a web browser application.

16. The device of claim 11, where the metadata includes data derived from one or more of a browsing history of the user, a searching history of the user, user bookmarks, a shopping history of the user, or user generated documents.

17. The device of claim 11, where the custom toolbar code, in addition to including the one or more toolbar objects, includes one or more other toolbar objects,
- where the one or more other toolbar objects were not selected by the user.

18. A non-transitory computer-readable medium storing instructions, the instructions comprising:
- one or more instructions that, when executed by at least one processor, cause the at least one processor to:
  - provide, to a client device associated with a user, information identifying a plurality of sources from which metadata is available,
    - each source, of the plurality of sources, corresponding to a service that includes a corresponding account associated with the user, and
    - the metadata being associated with one or more of:
      - a browsing history of the user,
      - a searching history of the user,
      - user bookmarks,
      - a shopping history of the user, or
      - documents generated by the user;
  - receive permission from the user to access the plurality of sources;
  - access, based on the received permission, the plurality of sources;
  - receive, based on accessing the plurality of sources, the metadata from the plurality of sources;
  - match the received metadata to a set of toolbar objects to determine a group of recommended toolbar objects for the user,
    - each toolbar object, in the set of toolbar objects, including an object designed to be included in a toolbar of an application program;
  - provide information identifying the group of recommended toolbar objects for display to the user;
  - receive a selection of one or more recommended toolbar objects, of the group of recommended toolbar objects;
  - generate custom toolbar code that includes the one or more recommended toolbar objects; and
  - transmit the custom toolbar code to the client device for installation of the custom toolbar code to implement a custom toolbar in the application program.

19. The computer-readable medium of claim 18, where the received metadata includes data derived from at least one of the browsing history or the searching history of the user.

20. The computer-readable medium of claim 18, where the instructions further comprise:
- one or more instructions that, when executed by the at least one processor, cause the at least one processor to:
  - select, based on the metadata, a toolbar template from a plurality of toolbar templates, and
  - where the one or more instructions that, when executed by the at least one processor, cause the at least one processor to generate the custom toolbar code include:
    - one or more instructions that, when executed by the at least one processors, cause the at least one processor to generate the custom toolbar code based on the toolbar template.

21. The computer-readable medium of claim 18, where the generated custom toolbar code includes toolbar objects to present advertisements to the user.

22. The computer-readable medium of claim 18, where the generated custom toolbar code includes a toolbar object that, when selected by the user, changes the toolbar objects presented by the custom toolbar.

23. The computer-readable medium of claim 18, where the one or more instructions that, when executed by the at least one processor, cause the at least one processor to match the received metadata include:
- one or more instructions that, when executed by the at least one processor, cause the at least one processor to analyze the received metadata to determine topics or keywords in which the user is interested.

24. A method comprising:
- providing, by a device and to a client device associated with a user, information identifying a plurality of sources from which metadata, relating to the user, is available,
  - each source, of the plurality of sources, corresponding to a service that includes a corresponding account associated with the user, and
  - metadata, received from each source, relating to activities associated with a use of the corresponding service by the user;
- receiving, by the device and based on providing the information identifying the plurality of sources, permission from the user to access the plurality of sources;
- accessing, by the device and based on receiving permission from the user, the plurality of sources;
- receiving, by the device and from the plurality of sources, metadata relating to the activities;
- matching, by the device, the received metadata to a set of toolbar objects to obtain a group of recommended toolbar objects for the user,
  - each toolbar object, in the set, including an object designed to be included in a toolbar of a web browser;
- verifying, by the device and through an interaction with the user, that particular recommended toolbar objects, of the group of recommended toolbar objects, are desired by the user;
- generating, by the device, custom toolbar code that includes code corresponding to the particular recommended toolbar objects; and transmitting, by the device, the custom toolbar code, to the user, for installation of the custom toolbar code to implement a custom toolbar in the web browser.

25. The method of claim 24, where generating the custom toolbar code includes:
  inserting the code corresponding to the particular recommended toolbar objects into code of a toolbar template.

26. The method of claim 24, where matching the received metadata to the set of toolbar objects further includes:
  determining topics associated with the received metadata;
  associating the toolbar objects, in the set of toolbar objects, with topics to which the toolbar objects relate; and
  matching the topics associated with the received metadata to the topics to which the toolbar objects relate to obtain the particular recommended toolbar objects.

* * * * *